Patented May 31, 1949

2,472,020

UNITED STATES PATENT OFFICE 2,472,020

GAS-SHIELDED CARBON ARC WELDING OF MAGNESIUM

Paul Klain, Midland, and Robert B. MacPhail, Bay City, Mich., assignors to The Dow Chemical Company, Midland, Mich., a corporation of Delaware No Drawing. Application August 7, 1946, Serial No. 688,972

5 Claims. (Cl. 219—10)

This invention relates to an improvement in the inert gas-shielded arc welding of magnesium and magnesium-base alloys.

In the gas-shielded arc welding of magnesium and its alloys as heretofore carried out, the arc is maintained between the work and a tungsten or other refractory metal electrode. Simultaneously, a stream of an inert gas, usually a noble gas such as helium or argon, is directed around the electrode toward the work to blanket the molten weld metal and protect it against oxidation. A detailed description of the process is given in U. S. Patent 2,342,086.

This process, although of wide usefulness, is somewhat disadvantageous in that the refractory metal electrodes are expensive and often difficult to obtain, and, even in small sizes, are quite heavy. There is also a considerable tendency for small particles of the tungsten or other metal to become embedded in the weld metal, where they may act as corrosion centers. In addition, when such electrodes are operated near their maximum permissible currents, sizeable particles of the electrode tend to melt off and fly into the molten weld metal with considerable violence, causing hazardous splashing.

Attempts have been made from time to time to overcome these difficulties by using carbon rods in place of the tungsten or other metal electrodes, but the results were uniformly disappointing. Poor fusion, dirt inclusions, and oxidation of the magnesium weld metal were invariably encountered. In consequence, it has often been reported that acceptable gas-shielded arc welding of magnesium, using carbon electrodes, is not possible. See, for example, Sheet Metal Industries 22, 1251 (1945).

The principal object of the present invention, then, is to provide an improved procedure by which carbon electrodes may be used simply and effectively in the inert gas-shielded arc welding of magnesium and magnesium-base alloys.

The invention depends on the discovery that carbon electrodes may be successfully used in gas-shielded arc welding of magnesium, provided that the welding current intensity, in terms of amperes per inch of electrode perimeter, is carefully limited so as not to exceed a certain maximum value. These maximum intensities are far lower than those used in the carbon arc welding of other metals and in the refractory metal electrode arc welding of magnesium.

The physical phenomena involved in the discovery are not well understood, but appear to involve the unusual behavior of electrical arcs in a magnesium vapor atmosphere and also the action of the vapor on heated carbon. In any event, it is startlingly apparent to the welder that when the current intensity is below the maximum value, no difficulties are encountered and welding proceeds easily in a manner similar to the gas-shielded tungsten arc welding of magnesium. If, however, the maximum value is exceeded, a film or dust of extremely fine carbon or carbide particles forms on the surface of the molten weld metal, preventing coalescence, permitting serious oxide formation, causing arc instability, and rendering satisfactory welding impossible.

It is a matter of empirical observation that, in welding with carbon electrodes of different sizes, the maximum operable current bears a very nearly constant ratio to the perimeter (or the diameter) of the electrode. This circumstance, that the maximum current varies almost linearly with the electrode perimeter, permits expressing the maximum current intensity according to the invention as amperes per inch of perimeter. These values appear to be independent of the physical character of the carbon electrode, both hard carbon and graphite rods being operable according to the invention at the same currents.

In general, the maximum operable current intensity, in the shielded carbon arc welding of magnesium and its alloys, has been found, for direct-current welding to be about 100 amperes per inch of electrode perimeter, and, for alternating current welding, about 210 amperes per inch. Careful determinations on standard sizes of cylindrical carbon rods indicate, as good working values for the maximum current, the following:

| Electrode Diameter, Inches | Maximum Current, Amperes | |
|---|---|---|
| | D. C. | A. C. |
| 1/8 | 40 | 65 |
| 3/16 | 60 | 120 |
| 1/4 | 80 | 165 |
| 5/16 | 100 | 205 |
| 3/8 | 115 | 235 |

For best results, it is preferable in welding to avoid approaching these values too closely and to regulate the average currents to, say, 80 per cent of the upper limits given.

It will, of course, be appreciated that the precise numerical values of the maximum current intensities above may vary slightly with different welders and at different welding speeds. In general, however, the upper limit of operable current intensity for each electrode size is fairly sharply defined and can be readily ascertained by the welder.

In actual arc welding of magnesium alloys according to the invention, there is chosen a hard carbon or graphite rod having a diameter sufficiently large that, at the current required for the particular work, the current intensity will not exceed the maximum value as given above. This rod is inserted in a standard gas-shielded arc welding torch in place of the tungsten rod heretofore used. The welding machine is then set so that currents above that selected will not be delivered, after which the protective noble gas is caused to flow around the electrode in position to blanket the work. Welding is then carried out in accordance with the standard procedures of gas-shielded arc welding of magnesium.

Direct current carbon arc welding of magnesium alloys is best conducted with reverse polarity, i. e. with the work negative and carbon electrode positive. In alternating current welding, the stability of the arc is improved by superimposing a small high frequency current, e. g. of 100 kilocycles, upon the welding current, using standard known equipment for this purpose. The numerical values for current intensities given above were determined while welding in these preferred ways.

What is claimed is:

1. In the inert-gas-shielded refractory electrode arc welding of magnesium and weldable magnesium-base alloys wherein the shielding gas is selected from the class consisting of helium and argon, the improvement which comprises maintaining a welding arc between the work and a carbon electrode and limiting the arc current intensity to a value below that at which carbon dust is deposited on the molten weld metal, such value corresponding to below about 100 amperes per inch of electrode perimeter in the case of a direct-current arc and below about 210 amperes per inch in the case of an alternating-current arc.

2. In the inert-gas-shielded direct-current arc welding of magnesium and weldable magnesium-base alloys wherein the shielding gas is selected from the class consisting of helium and argon and wherein a welding arc is maintained between the work as negative electrode and a carbon rod as positive electrode, the improvement which comprises limiting the arc current intensity to a value corresponding to below about 100 amperes per inch of electrode perimeter.

3. In the inert-gas-shielded alternating current arc welding of magnesium and weldable magnesium-base alloys wherein the shielding gas is selected from the class consisting of helium and argon and wherein a welding arc is maintained between the work and a carbon rod, the improvement which comprises limiting the welding current intensity to a value corresponding to below about 210 amperes per inch of electrode perimeter.

4. In the noble-gas-shielded refractory electrode arc welding of magnesium and weldable magnesium-base alloys wherein the shielding gas is selected from the class consisting of helium and argon, the improvement which comprises maintaining a direct-current welding arc between the work as negative electrode and a hard carbon rod as positive electrode and limiting the current to a value, dependent on the electrode diameter, not substantially exceeding that defined as follows: $\frac{1}{8}$-inch diameter, 40 amperes; $\frac{3}{16}$-inch, 60 amperes; $\frac{1}{4}$-inch, 80 amperes; $\frac{5}{16}$-inch, 100 amperes; and $\frac{3}{8}$-inch, 115 amperes.

5. In the noble-gas-shielded refractory electrode arc welding of magnesium and weldable magnesium-base alloys wherein the shielding gas is selected from the class consisting of helium and argon, the improvement which comprises maintaining an alternating current welding arc between the work and a hard carbon rod, and limiting the welding current to a value, dependent on the electrode diameter, not substantially exceeding that defined as follows: $\frac{1}{8}$-inch diameter, 65 amperes; $\frac{3}{16}$-inch, 120 amperes; $\frac{1}{4}$-inch, 165 amperes; $\frac{5}{16}$-inch, 205 amperes; and $\frac{3}{8}$-inch, 235 amperes.

PAUL KLAIN.
ROBERT B. MacPHAIL.

REFERENCES CITED

The following references are of record in the file of this patent:

UNITED STATES PATENTS

| Number | Name | Date |
|---|---|---|
| 1,746,081 | Hobart | Feb. 4, 1930 |
| 1,746,191 | Devers | Feb. 4, 1930 |

OTHER REFERENCES

Piper, "Heliarc Welding of Stainless Steel," "Welding Journal," October 1942, pages 490S and 523S.

General Electric Review, October 1943, page 575.

Wassell, "Characteristics of Welding Arcs on Aluminum in Atmospheres of Helium and Argon," "The Welding Journal," October 1944, pages 487S-493S.